United States Patent [19]
Gassman

[11] 3,946,162
[45] Mar. 23, 1976

[54] SYSTEM FOR TRANSFERRING WIDEBAND SOUND SIGNALS

[75] Inventor: Gerhard-Gunter Gassman, Berkheim, Germany

[73] Assignee: International Standard Electric Corporation, New York, N.Y.

[22] Filed: May 17, 1974

[21] Appl. No.: 470,880

[30] Foreign Application Priority Data
June 4, 1973  Germany............................ 2328316
June 4, 1973  Germany............................ 2328317

[52] U.S. Cl.... 179/15.55 R; 179/15.55 T; 179/1 SA
[51] Int. Cl.².......................... H04J 3/00; G10L 1/00
[58] Field of Search .: 179/15.55 R, 15.55 T, 15 AS, 179/15 BM, 1 SA

[56]  References Cited
UNITED STATES PATENTS

| | | | |
|---|---|---|---|
| 3,030,450 | 4/1962 | Schroeder................... | 179/15.55 R |
| 3,102,929 | 8/1963 | De Jager..................... | 179/15.55 R |
| 3,116,374 | 12/1963 | Franco......................... | 179/15.55 R |
| 3,321,582 | 5/1967 | Schroeder................... | 179/15.55 R |

Primary Examiner—Kathleen H. Claffy
Assistant Examiner—E. S. Kemeny
Attorney, Agent, or Firm—John T. O'Halloran; Menotti J. Lombardi, Jr.; Peter Van Der Sluys

[57] ABSTRACT

A system for transmitting wideband signals, for example speech, over a narrow band is proposed. Lower frequency range signals are directly transmitted and amplitude information of partial upper frequency ranges is transmitted on pilot frequencies. At a receiver, "equivalent" signals from oscillators having frequencies approximately equal to the mid range frequencies of the partial upper frequency ranges are modulated with the amplitude information of the corresponding partial upper frequency ranges to produce "synthetic" signals. The synthetic signals are modulated with narrow band noise to crreate a more pleasing and realistic sound. Means are provided for controlling at the pick-up end the "modulation factor" of the noise modulation at the reproducing end. This is achieved by controlling the level of the third harmonic of a sync signal transmitted from the pick-up end. The level of the third harmonic may be automatically or manually adjusted to conform to the type of sound being transmitted.

10 Claims, 7 Drawing Figures

SYSTEM FOR TRANSFERRING WIDEBAND SOUND SIGNALS

BACKGROUND OF THE INVENTION

1. Field of the Invention

The present invention relates to a system for transferring wideband sound signals and more particularly to a system wherein a lower frequency range is transmitted directly and a higher frequency range is divided into partial bands of which only amplitude information is transmitted on pilot signals.

2. Description of the Prior Art

My U.S. Pat. Nos. 3,875,341 and 3,894,190 describe systems for transferring wideband sound signals wherein, at the input end of the system, the sound signal is divided into a lower and a higher frequency range. The partial signal of the lower frequency range is transferred directly and instead of the partial signal of the higher frequency range being transferred, the amplitude information of the partial frequency ranges obtained by splitting up said higher frequency range by means of bandpass filters is transferred. For reproducing the total signal, the amplitude information of the partial frequency ranges serves as a modulating signal for equivalent signals lying approximately in the middle of the individual partial frequency ranges to produce a synthetic signal, and said synthetic sound signals of the partial frequency ranges of the higher frequency range are added to the directly transferred partial signal of the lower frequency range.

During the practical operation of such a system, it has become apparent that at the reproducing end, the restoration of the sound signals of certain tone sources, which include the human voice in particular, does not sufficiently meet the requirements placed on high-quality reproduction.

Subsequent investigations have shown that this phenomenon is connected with the peculiar characteristic of these tone sources, such as the human voice, for the latter is a tone source whose sound signals have a continuous spectrum at least in the upper frequency range.

Bandwidth compression of speech signals has been proposed in U.S. Pat. Nos. 3,030,450 and 3,431,362 and these patents propose the use of noise signals to create a more realistic reproduction of speech signals. These systems are satisfactory for telephone speech reproduction but do not provide hi fidelity reproduction.

I have already proposed, in my previously mentioned patents, providing at the input end of the system, i.e., e.g., at the transmitting end, a second pick-up channel to which those sound signals are applied which have a predominantly continuous spectrum in the upper frequency range. In this channel, a split-up into an upper and a lower frequency range takes place, with the partial signal of the lower frequency range being added to that of the first pick-up channel and the partial signal of the upper frequency range being applied to a single rectifier circuit for the formation of an amplitude information. At the reproducing end, this amplitude information serves to modulate a noise voltage which has approximately the same frequency spectrum as the upper frequency range of the second pick-up channel.

SUMMARY OF THE INVENTION

The invention has for its object to eliminate the need for a second, separate pick-up channel at the input end of the system, while maintaining the quality of the sound signal to be reproduced.

The solution according to the invention is characterized in that, at the reproducing end, the synthetic signals, before being added to the partial signal of the lower frequency range, are additionally modulated with narrowband noise signals.

Besides reducing the circuit complexity at the pick-up end, the simplification has the much more important advantage that, during pick-up, complete freedom of movement is insured and tone sources can be grouped under musical aspects as usual.

In the simplest case, for example, the synthetic signals are added together and the total synthetic signal obtained is amplitude-modulated with the output signal of a noise generator.

In another embodiment of the invention, which permits better sound reproduction, the synthetic signals are quadrature-modulated with the output signals of two noise generators which are independent of each other.

As regards the circuit design, this solution can be realized in a particularly simple manner by dividing each synthetic signal into two components shifted in phase by 90° with respect to each other, adding the corresponding components of all synthetic signals into two total equivalent signals, amplitude-modulating, in a modulator using carrier suppression, each of the two total synthetic signals with the noise signals, which are independent of each other, and subsequently adding the two total synthetic signals together.

In a further embodiment, the modulation factor of the modulation of the synthetic signals with the narrowband noise signals is controllable at the reproducing end, and that a signal transferred from the pick-up end can be evaluated as a criterion for the control. This solution has the advantage that the improvement in the quality of the sound signal is maintained during the transmission of the total pilot signal even in case of wide bandwidth variations.

A system of the kind referred to by way of introduction has been proposed wherein, at the input end, a pilot signal containing the amplitude information of the individual partial ranges of the upper frequency range is positively modulated in such a manner that, on a time average, the amplitude of the pilot signal is lowered with respect to the amplitude of the signal of the lower frequency range by a factor P which represents the so-called limit of perceptibility, wherein the amplitude of the sync signal does not exceed the level of the system noise in the equipment being considered for compatibility, and wherein, at the receiving or reproducing end, the sync signal is selectively evaluated in such a manner that the signal-to-noise ratio of the selected sync signal is substantially equal to the signal-to-noise ratio of the signal of the lower frequency range.

In such a system it is particularly advantageous if the signal for controlling the modulation factor is the amplitude value of a harmonic of the fundamental frequency of a sync signal which is transferred or stored as a trapezoidal voltage simultaneously with the amplitude information of the upper frequency range and has a frequency corresponding to one-half the repetition frequency of the sequential transfer of the amplitude information, because the additional intelligence must be transferred by merely changing an otherwise subordinate characteristic of the sync signal and not in a separate time or frequency channel.

3

DESCRIPTION OF THE DRAWINGS

Further details and advantages of the invention will be apparent from the following description of the embodiment of the invention exemplified by the accompanying drawings, in which.

DESCRIPTION OF THE PREFERRED EMBODIMENT

Figure 1:
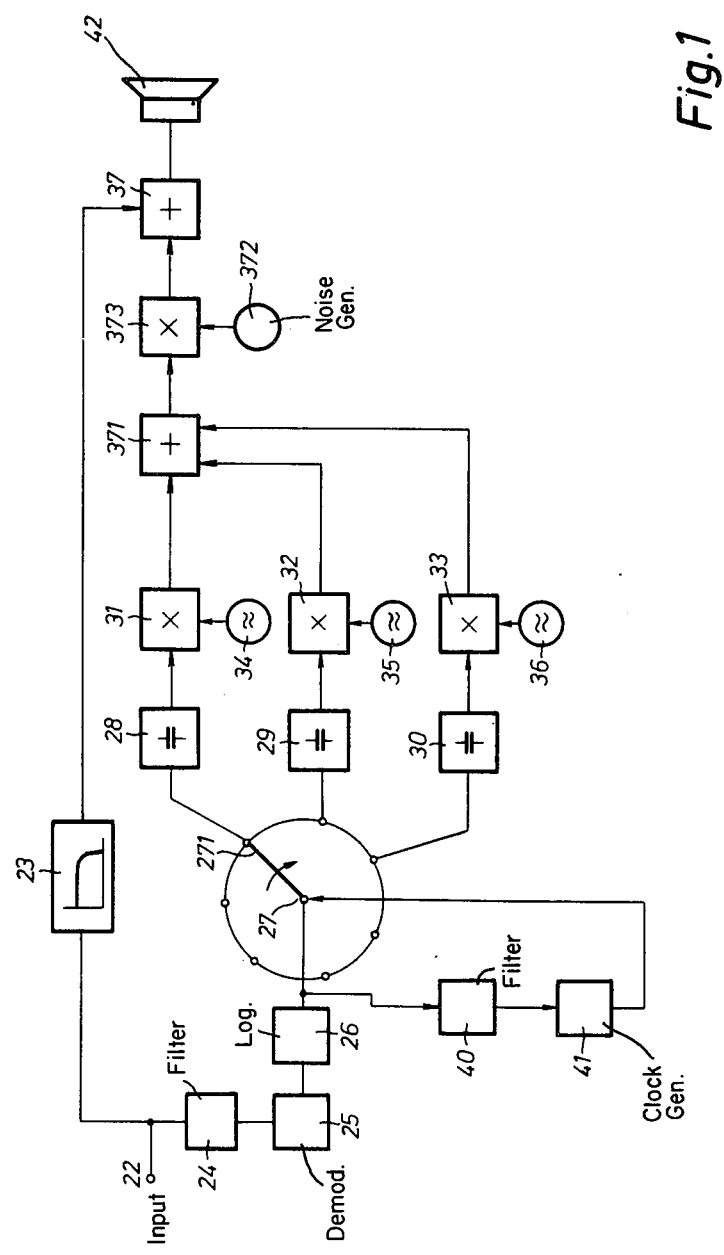
FIG. 1 is a block diagram of the reproducing end wherein the combined synthetic signal of the upper frequency range is amplitude-modulated with the output signal of a noise generator.

Referring to FIG. 1, which is similar to FIG. 2b of my U.S. Pat. No. 3,875,341 and has identical reference numerals, the reference numeral 22 designates the input terminal for the transmitted total signal. If this signal has been transmitted in modulated form, 22 is the output of the demodulator (not shown) for the total signal. 23 is a low-pass filter at the reproducing end. Connected in parallel therewith is a bandpass filter 24 which only passes the frequency range of the pilot signal. Connected in series therewith is a demodulator 25. If the pilot signal has been frequency-modulated, the demodulator is a frequency discriminator. A following logarithmic deemphasis network 26 cancels any logarithmic pre-emphasis picked-up at the transmitting end. From the output of the logarithmic deemphasis network 26 the signal is applied to the rotating switch 27, from whose "contacts" the volume information associated with the individual time channels is taken and applied to the storage capacitors 28, 29, and 30 and to further storage capacitors (not shown). From the storage capacitors the volume information of the indivudal channels is applied to the modulators 31, 32, 33, etc., which, in turn, modulate the equivalent signals of the local oscillators 34, 35, and 36 to provide synthetic signals. Local oscillators 34, 35 and 36 generate the equivalent frequencies for the respective partial range. Behind the demodulator 25, the demodulated pilot signal is additionally fed to an amplitude filter 40 which responds to the sync signal. The signal appearing at the output of this amplitude filter 40 serves to restore the rotating switch 27 to the position corresponding to the synchronization, from which position the switch is advanced step by step with the clock generator 41. In an adder circuit 371 the synthetic signals of the modulators 31, 32, 33, which simulate signals of the individual partial frequency ranges, are added into a total synthetic signal. This total synthetic signal is amplitude modulated, in a noise modulator 373, with narrow band noise voltage generated in a noise generator 372, and limited in bandwidth with the lowpass filter (not shown). The total signal, modulated in this way, is finally amplitude-modulated, in the adder circuit 37, with the baseband delivered by the lowpass filter 22 before being fed through reproducing amplifiers (not shown) to loudspeaker 42. The bandwidth of the noise signal appearing behind the lowpass filter (not shown) is to be equal to one-half the bandwidth of the frequency spacings of the equivalent signals. If the frequency spacings are graded logarithmically, the bandwidth of the noise signal should be greater than one-half the frequency spacing of the lowest equivalent tones, but smaller than one-half the frequency spacings of the highest equivalent tones. In special cases, however, it may be expedient to permit overlapping with, and thus crosstalk to, adjacent ranges by choosing the bandwidth of the noise signal to be greater than one-half the frequency spacing of the equivalent signals.

Figure 2:
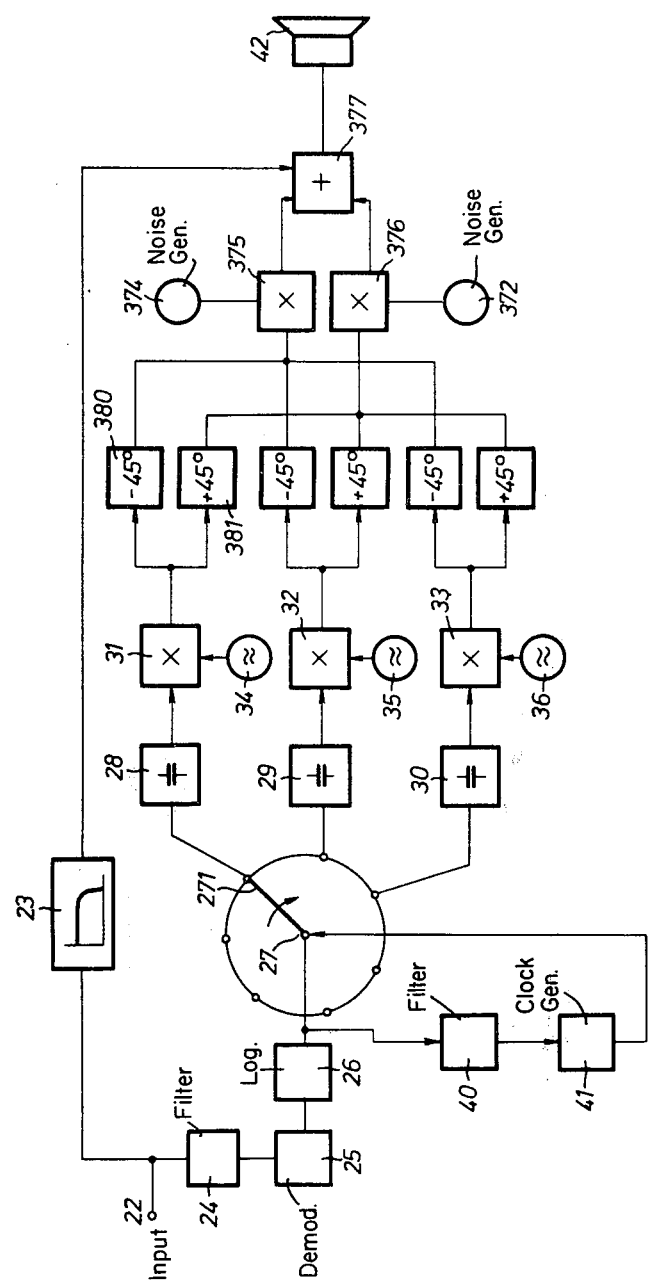
FIG. 2 is a block diagram of the reproducing end if quadrature modulation is used.

FIG. 2 shows a block diagram of the reproducing end in case of quadrature modulation being used. To this end, the synthetic signals leaving the modulators 31, 32, 33 are shifted, in the phase shifters 380, by, e.g., 45° in the negative direction and, in the phase shifters 381, by 45° in the positive direction, so that synthetic signals associated with each other will be in quadrature. Synthetic signals shifted in phase in the same direction are added together and the two total synthetic signals obtained in this way are amplitude-modulated, in two modulators using carrier suppression, with the noise signals of the two independent noise generators 372 and 374. The two total synthetic signals, modulated in this manner, are finally added together and thus form a single quadrature-modulated total signal, which is added to the baseband signal leaving the lowpass filter 22. These additions are performed in the adder circuit 370, whose outputs are fed via amplifiers (not shown) to a loudspeaker 42. The circuit of FIG. 2 is particularly economical in components. However, the ear-physiological effect may be considerably further improved by quadrature-modulating each individual synthetic signal instead of the total signals. This adds to the expense, which, however, is of no importance in professional applications.

Alternatively, instead of forming total signals which are quadraturemodulated, the ear-physiological effect may be improved in professional applications, where the expense is no essential consideration, by separately amplitude-modulating the two components of each synthetic signal, shifted by 90°, with two amplitude modulators having independent noise sources and then adding all signals, amplitude-modulated with noise in this way, to the signal of the lower frequency range.

Figure 3:
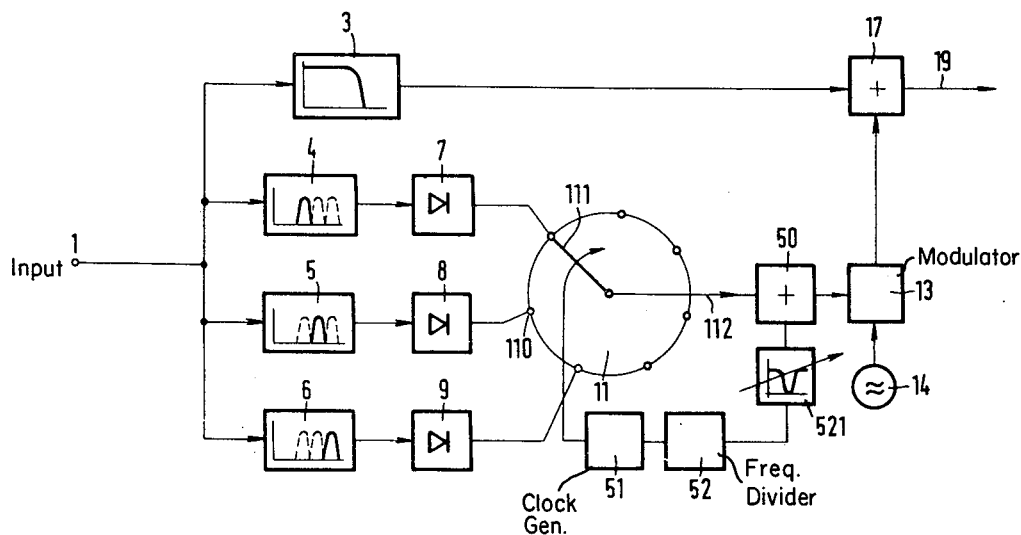
FIG. 3 is a block schematic of the input end of the system using sequential transfer of the amplitude information and simultaneous transfer of the sync signal.

FIG. 3 shows the transmitter of an improved embodiment wherein the modulation factor of the noise modulation may be controlled at the transmitter. The wideband sound signal to be transferred is applied to the input terminal 1 in FIG. 3. This terminal 1 is connected to a lowpass filter 3 whose bandwidth or cut-off frequency lies in the range of about 4 to 7 kHz depending on the qualitative requirements imposed on the sound signal. Connected in parallel with the lowpass filter 3 are bandpass filters 4, 5 and 6 and, if necessary, further bandpass filters (not shown), which divide the higher frequency range, which does not pass the lowpass filter 3, into partial ranges.

This may be done, for example, by dividing an octave into 12 partial ranges according to the semitones of this octave. The filters 4, 5 and 6 are followed by rectifiers 7, 8 and 9, respectively, at whose outputs appears a volume-dependent amplitude information of the associated partial frequency range. In the present example, the amplitude information is successively and cyclically taken off an electronic, so-called rotating switch 11. It is assumed that the rotational frequency of the switch 11 has the value $f1$. Accordingly, if the number of switch terminals 110 is $n$, the frequency of the sample values of the amplitude information will be $fT = n \cdot f1$. The clock generator 51 determines the step frequency $fT$ of the switch 11. Via an adder circuit 50, whose function will be explained hereinbelow, the successive amplitude information is fed to a modulator 13 where this amplitude information modulates the pilot frequency delivered by a pilot generator 14. In an adder circuit 17 the modulated pilot signal and the sound signal appearing at the output of the lowpass filter 3 are added into a common output signal 19.

For generating the simultaneously transmitted sync signal, a frequency divider 52 is connected to the clock generator 51. It divides the clock or step frequency $fT$ at a $1:2n$ ratio, this division being effected so that the divided voltage has a fixed phase relationship to the respective position of the rotating switch. Via a tunable rejector circuit 521, which will be explained below, this divided square-wave or trapezoidal voltage is added as a sync signal to the pilot signal in the adder circuit 50.

According to the invention, the tunable rejector circuit 521 is used to reduce one harmonic, preferably the third harmonic, of this sync signal. The measure of the reduction of this harmonic serves as information for controlling the modulation factor of the noise modulation of the equivalent signals at the reproducing end.

Figure 4:
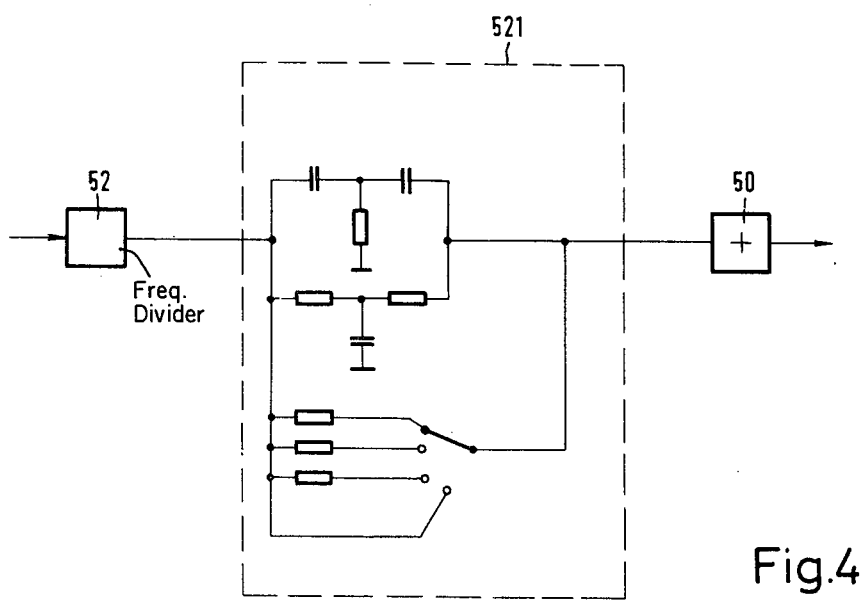
FIG. 4 shows one embodiment of a tunable rejector circuit.

FIG. 4 shows one embodiment of such a tunable rejector circuit for reducing a harmonic of the sync signal. 52 is the frequency divider for generating the sync signal, and 50 the adder circuit with which the sync signal is added to the pilot signal. The actual filter circuit consists of an RC lowpass filter and an RC highpass filter in a bridge configuration which together are so proportioned in known manner that the harmonic to be reduced is completely suppressed. Connected in parallel with this filter network are a changeover switch and various resistors in series, through which the filter is rendered ineffective in different steps. It is possible, of course, to replace the switch and the fixed resistors by a continuously adjustable potentiometer.

Figure 5:
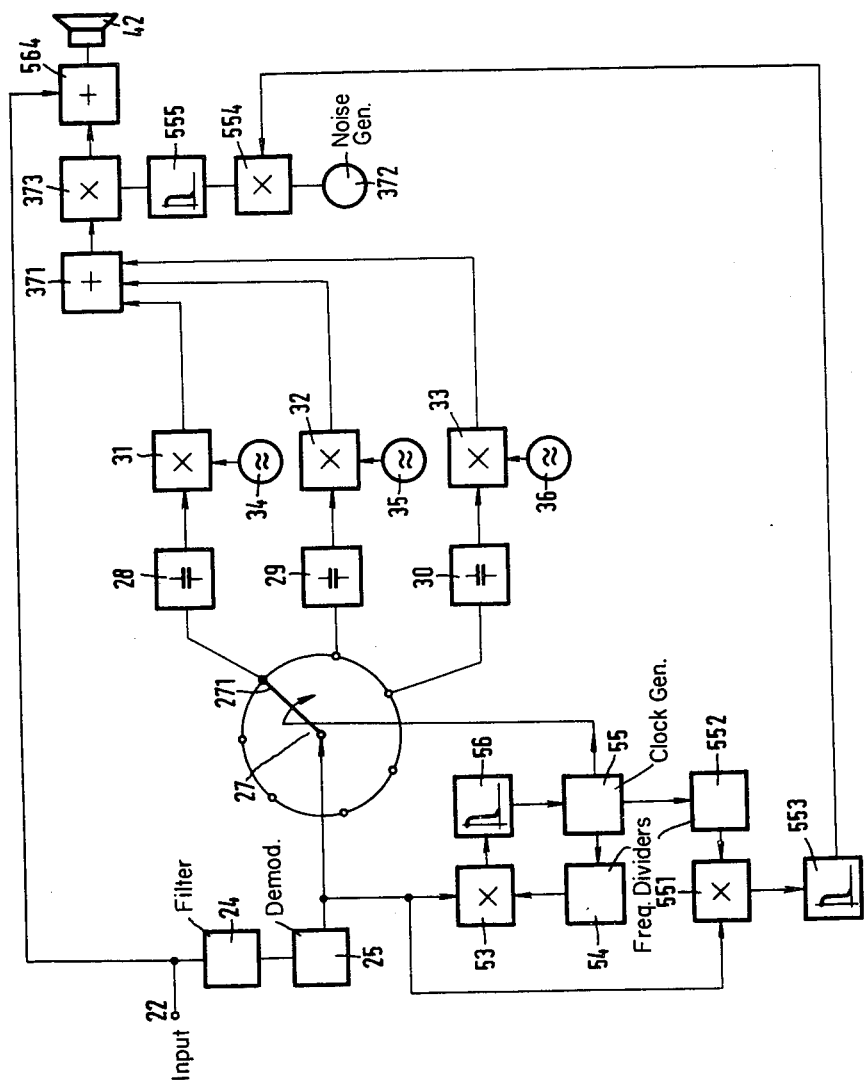
FIG. 5 is a block schematic of the reproducing end.

The transferred total signal is applied to the input terminal 22 of FIG. 5. It consists of the directly transferred sound signal of the lower frequency range and the pilot signal, which has been modulated with the amplitude information of the partial ranges of the upper frequency range and lowered by the factor P with respect to the sound signal of the lower frequency range and which contains the sync signal, whose amplitude is very small compared with the possible maximum amplitude of the total pilot signal. Its frequency corresponds to half the repetition frequency of the sequential transfer of the amplitude information.

The reproduction unit has a bandpass filter 24 which passes only the frequency range of the pilot signal and is followed by a demodulator 25. The demodulated sequence of amplitude information is fed to the rotating switch 27, from whose "contacts" the volume information associated with the individual time channels is taken and applied to storage capacitors 28, 29 and 30 and to further storage capacitors (not shown). From the storage capacitors the volume information of the individual channels is applied to modulators 31, 32, 33 etc., which, in turn, modulate the signals of the oscillators 34, 35 and 36, which generate the equivalent frequencies for the respective partial range.

The sync signal is evaluated by feeding the total output signal of the demodulator 25 to a symmetrical multiplicative mixer 53, to whose second input the output signal of a frequency divider 54 is applied. This frequency divider 54 divides the frequency of the clock generator 55, in the same way as the frequency divider 52, at a ratio of $1:2n$. In the synchronized condition, the DC voltage component of the output voltage of the multiplicative mixer 53 thus depends only on the phase difference between the sync signal and the divided signal. For example, the amplitude of the sync signal is positive in case of positive phase deviation. With the following lowpass filter 56, which has a bandwidth of about 0.5 Hz, this DC voltage component is separated from the considerably higher-frequency AC components. In the non-synchronized condition, instead of the DC voltage, an AC voltage is obtained according to the frequency deviation, but, in the present case, this deviation must not appreciably exceed 0.5 Hz. The filtered voltage is used to synchronize the clock generator 55.

To evaluate the amplitude information of the sync-signal harmonic, whose amplitude has been reduced at the pick-up end by means of the tunable rejector circuit 521, the clock frequency of the clock generator 55 is divided, in a second frequency divider 552, to a frequency which corresponds to the respective harmonic of the sync signal. The reference voltage obtained in this way is fed to a multiplicative mixer 551, to which the sync-signal-containing pilot signal is applied as well. The output voltage of this multiplicative mixer is filtered with a very narrow-band lowpass filter 553. The bandwidth of this filter 553 should be smaller than that of the lowpass filter 56. The amplitude of the voltage delivered by the filter 553 is proportional to the amplitude of the harmonic passed by the rejector circuit 521 at the transmitting end. This voltage, which serves as a control signal, is applied to an attenuator 554, which reduces the noise voltage of the noise generator 372 to the level which a sound engineer, for example, has preselected at the pickup end by adjusting the rejector circuit 521. The noise voltage, attenuated in this way, is limited in bandwidth in a lowpass filter 555 and applied to a noise modulator 373 where the total signal of all synthetic signals, which was generated in the adder circuit 371, is additionally modulated with this noise. 564 is an adder circuit where the total signal of the synthetic signals, processed in this way, is added to the transmitted partial signal of the lower frequency range.

Figure 6:
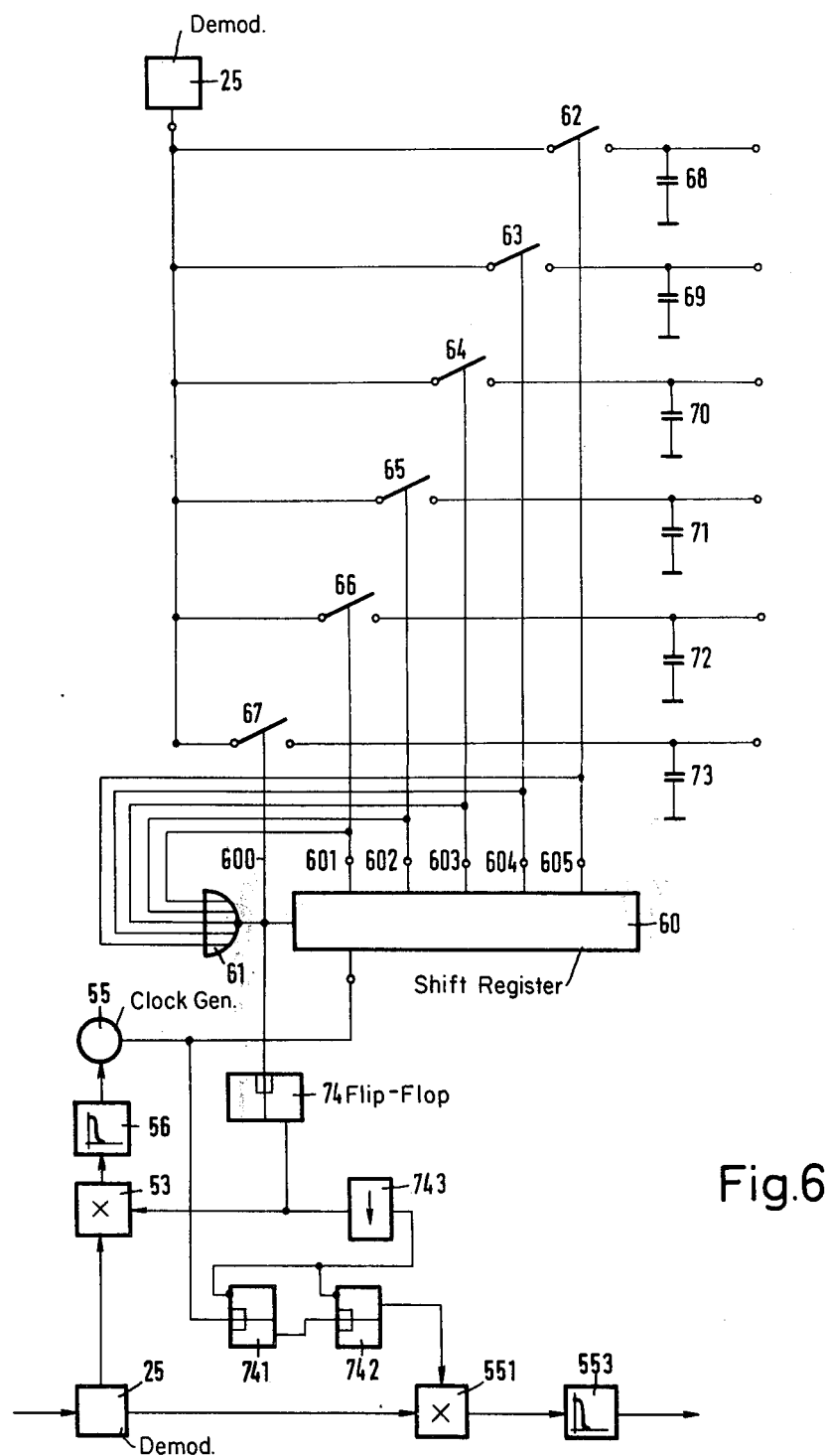
FIG. 6 shows one embodiment of the rotating switch.

Since the phase relationship between the 3rd harmonic of the sync signal and the reference voltage provided by the frequency divider 552 must be such that, in the synchronized condition, the full amplitude of the 3rd harmonic appears behind the filter circuit 553, the details of the frequency dividers 552 and 54 as well as of the clock generator 55 and of the rotating switch 27 are not shown in FIG. 6.

FIG. 6 shows an embodiment of the rotating switch in electronic design for 6 channels. 60 is a five-stage shift register whose outputs 601 to 605 are connected via the NOR-gate 61 to its input 600. The clock generator 55 advances the shift register step by step. As a result of the outputs reacting via the NOR-gate 61 on the input, a control pulse always appears only either at the input terminal 600 or at the output terminals 601 to 605; this control pulse is used to successively switch the individual switches 62 to 67 of the rotating switch. The outputs of these switches are connected to the storage capacitors 68 to 73, whose function corresponds to that of the storages 28 to 30 of FIG. 5 from whose outputs the modulators of the individual channels, e.g. 31 to 33 in FIG. 5 are driven.

For generating the reference signal for the multiplicative mixer 53, which signal is to be compared with the sync signal, the clock frequency at the output of the NOR-gate 61, divided at a 1 : 6 ratio in relation to the clock frequency $fT$, is again divided 1 : 2 with a flip-flop 74. The voltage having the frequency divided in this way is the reference voltage for the synchronization. The sync signal is contained in the pilot signal, which is applied from the demodulator 25 to the multiplicative mixer 53. The function of the frequency divider designated 54 in FIG. 3 is performed here by the frequency division with the shift register 60 and by the frequency division of the flip-flop 74 at the ratio 1 : 2.

In FIG. 6 the frequency divider 552 of FIG. 5 is realized by the flip-flops 741 and 742. With these flip-flops the clock frequency $fT$ is divided at the ratio 1 : 4.

The phase of the thus obtained reference signal for the multiplicative mixer 551 must be identical with the phase of the 3rd harmonic of the sync signal. To achieve this phase relationship, the output voltage of the flip-flop 74 is applied via a monostable multivibrator 743 to the set inputs of the flip-flops 741 and 742.

Figure 7:
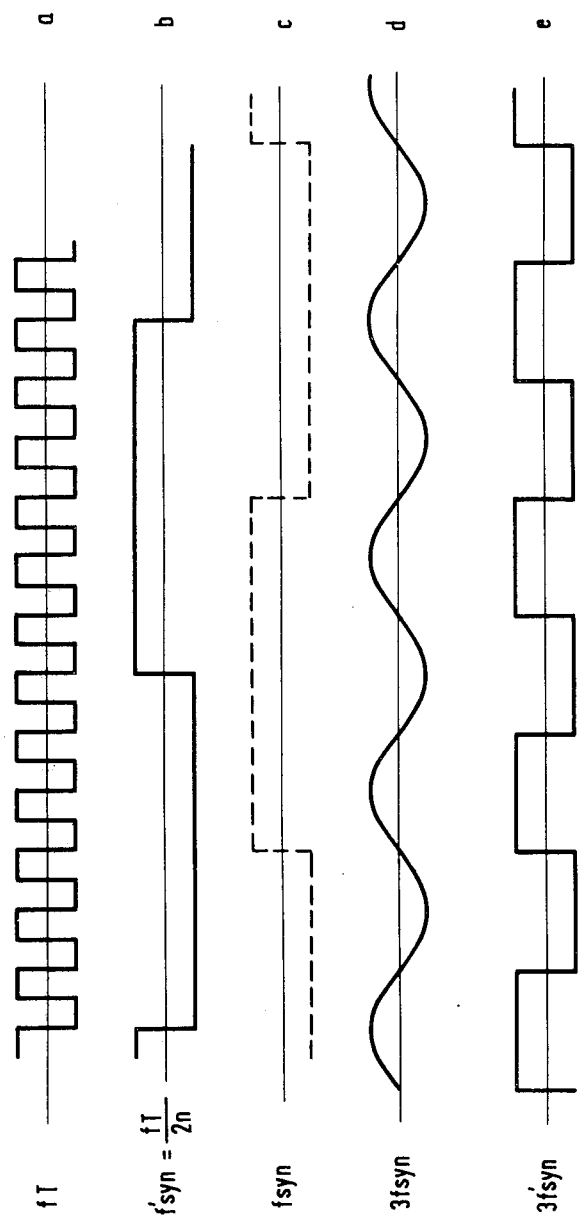
FIG. 7 shows voltage waveforms.

Referring to FIG. 7, the reference character $a$ designates the waveform of the voltage of the clock generator 55 with the frequency $fT$, while $b$ is the waveform of the reference voltage applied from the flip-flop 74 to the multiplicative mixer 53. The curve $c$ is the synchronizing voltage contained in the pilot signal and having the frequency $f$ syn; in the synchronized condition, it is shifted in phase by 90° with respect to the reference voltage with the frequency $f'$syn and offers a control voltage of O V via the filter 56 to the clock generator 55. The reference character $d$ designates the waveform of the 3rd harmonic contained in the square-wave sync signal, and the waveform $e$ is the reference voltage with the frequency 3 $f'$syn, applied in FIG. 6 from the flip-flop 742 to the multiplicative mixer 551. The special manner of resetting the two flip-flops 741 and 742 with the monostable multivibrator 743 insures that the phase relationship between the voltages according to curves $e$ and $d$ is 0 or 180° and prevents any 90° phase shift between the two signals. Thus, the output voltage of the filter 553, with which the output voltage of the multiplicative mixer 551 is filtered, is proportional to the amplitude of the 3rd harmonic according to waveform $d$ of FIG. 6.

What is claimed is:

1. A receiver for use in a system having a transmitter of the type that transfers lower frequency range sound signals directly and at least one pilot frequency signal modulated by an amplitude signal corresponding to the amplitude of the sound signals in a higher frequency range, said receiver comprising:
    means for receiving and demodulating the pilot frequency signal to provide an amplitude signal corresponding to the amplitude of the signal in the higher frequency range;
    means for providing an equivalent signal having a frequency approximately equal to the mid range frequency of the higher frequency range;
    means for modulating the equivalent signal with the amplitude signal to provide a synthetic signal;
    means for dividing the synthetic signal into a pair of quadrature signals;
    first and second means for providing noise signals;
    first and second means for modulating the pair of quadrature signals with the noise signals;
    means for receiving and reproducing the noise modulated quadrature signals and the directly transferred lower frequency range sound signal.

2. A transmitter for transferring wideband sound signals over a narrow frequency range, comprising:
    means for receiving the sound signals;
    means for dividing the received sound signals into a lower frequency range and a plurality of higher frequency ranges;
    means for providing amplitude signals corresponding to the amplitudes of the signals in each higher frequency range;
    means for providing a pilot frequency signal;
    means for providing a sync signal;
    means responsive to the sync signal for sequentially sampling said amplitude signals at a repetition rate corresponding to the sync signal;
    means for reducing a harmonic of the sync signal in accordance with a desired noise modulation factor and for modifying said sync signal;
    means for modulating the pilot frequency signal with the modified sync signal and the sequentially sampled amplitude signals; and
    means for transferring the signals of the lower frequency range, and the modulated pilot frequency signal.

3. A system for transferring and receiving wideband sound signals over a narrow frequency range, comprising:
    means for receiving the sound signals;
    means for dividing the received sound signals into a lower frequency range and a plurality of higher frequency ranges;
    means for providing amplitude signals corresponding to the amplitudes of the signals in each higher frequency range;
    means for providing a pilot frequency signal;
    means for providing a sync signal;
    means responsive to the sync signal for sequentially sampling said amplitude signals at a repetition rate corresponding to the sync signal;
    means for reducing a harmonic of the sync signal in accordance with a desired noise modulation factor and for modifying said sync signal;
    means for modulating the pilot frequency signal with the modified sync signal and the sequentially sampled amplitude signals;
    means for transferring the signals of the lower frequency range and the modulated pilot frequency signal;
    means for receiving and demodulating the sequentially modulated pilot frequency signal to provide sequential amplitude signals corresponding to the amplitudes of the signals in the higher frequency ranges;
    means for providing equivalent signals having frequencies approximately equal to the mid range frequency of each higher frequency range;
    means for modulating the equivalent signals with the amplitude signals to provide synthetic signals;
    means for distributing the sequential amplitude signals to the modulating means;
    means responsive to the sync signal for controlling and synchronizing said distributing means to assure proper distribution of the sequential amplitude signals;

means responsive to the sync signal for providing a noise modulation factor signal corresponding to the harmonic suppression of the sync signal;

means for providing a noise signal;

means for attenuating said noise signal in accordance with the noise modulating factor signal so that the noise signal has an amplitude corresponding to the desired noise modulation factor;

means for combining said synthetic sound signals and for providing a total synthetic signal;

means for modulating the total synthetic signal with the attenuated noise signal and for providing a noise modulated total synthetic signal; and means for receiving and reproducing the noise modulated total synthetic signal and the directly transferred low frequency range sound signal.

4. A receiver for use in a system having a transmitter of the type that transfers lower frequency range sound signals directly and the higher frequency range signals are divided into a plurality of partial higher frequency ranges and amplitude signals corresponding to the amplitudes of the sound signals in the partial higher frequency ranges are transmitted on at least one modulated pilot frequency, said receiver comprising:

means for receiving and demodulating the pilot frequency signal to provide amplitude signals corresponding to the amplitudes in the higher frequency ranges;

means for providing equivalent signals having frequencies approximately equal to the mid range frequencies of the partial higher frequency ranges;

means for modulating the equivalent signals with the amplitude signals to provide synthetic signals;

means for dividing each synthetic signal into two components shifted in phase by 90° with respect to each other;

means for combining the corresponding components of each synthetic signal;

first and second means for providing noise signals;

first and second means for modulating the two components of the phase shifted synthetic signals with the first and second noise signals; and means for receiving and reproducing the noise modulated synthetic signals and the directly transferred low frequency range sound signals.

5. A receiver for use in a system having a transmitter of the type that transfers lower frequency range sound signals directly and at least one pilot frequency signal modulated by an amplitude signal corresponding to the amplitude of the sound signals in a higher frequency range and that provides a signal corresponding to a desired noise modulating factor, said receiver comprising:

means for receiving and demodulating the pilot frequency signal to provide an amplitude signal corresponding to the amplitude of the signal in the higher frequency range;

means for providing an equivalent signal having a frequency approximately equal to the mid range frequency of the higher frequency range;

means for modulating the equivalent signal with the amplitude signal to provide a synthetic signal;

means for providing a noise signal;

means for receiving the noise modulating factor signal;

means responsive to the noise modulating factor signal for controlling the level of the noise signal;

means for modulating the synthetic signal with the level controlled noise signal; and means for receiving and reproducing the noise modulated synthetic signal and the directly transferred lower frequency range sound signal.

6. In a receiver of the type that receives a pilot signal sequentially modulated with amplitude signals corresponding to the amplitudes of sound signals in a predetermined number of partial frequency ranges and reproduces the sound signals in said partial frequency ranges by simulating said partial frequency ranges with equivalent frequency signals having frequencies approximately equal to the mid range frequencies of the partial frequency ranges, said equivalent signals being amplitude modulated to correspond to the amplitude of the signals in the partial frequency ranges, the improvement comprising:

means for providing a noise signal having a bandwidth approximately equal to one-half the bandwidth of the frequency spacing between the equivalent signals; and means for modulating the amplitude modulated signals with said noise signal to produce more realistic and pleasing simulation of the partial frequency ranges.

7. A receiver for use in a system having a transmitter of the type that transfers lower frequency range sound signals directly, a pilot frequency signal sequentially modulated by amplitude signals corresponding to the amplitudes of sound signals in a predetermined number of partial higher frequency ranges, a sync signal corresponding to the repetition rate of the sequential modulation of the pilot frequency signal and a signal containing noise modulation factor information, said receiver comprising:

means for receiving and demodulating the sequentially modulated pilot frequency signal to provide sequential amplitude signals corresponding to the amplitudes of the signals in the partial higher frequency ranges;

means for providing equivalent signals having frequencies approximately equal to the mid range frequency of each partial higher frequency range;

means for modulating each equivalent signal with the appropriate amplitude signal to provide synthetic signals for each partial higher frequency range;

means for distributing the sequential amplitude signals to the modulating means;

means for providing a noise signal;

attenuation means responsive to the noise modulation factor signal for attenuating the noise signal in accordance therewith;

means for combining the synthetic signals to provide a total synthetic signal;

means responsive to the attenuated noise signal for modulating the total synthetic signal therewith; and means for receiving and reproducing the noise modulated synthetic signals and the directly transferred low frequency range sound signals.

8. A receiver as described in claim 7, wherein the noise modulation factor signal is transmitted as a component of the sync signal.

9. A receiver as described in claim 8, wherein the noise modulation factor signal corresponds to the amplitude level of a harmonic of the sync signal.

10. A receiver as described in claim 9, wherein the noise modulation factor signal is transferred as a trapezoidal voltage simultaneously with the amplitude information of the partial higher frequency ranges and as a frequency corresponding to one-half the repetition frequency of the sequential transfer of amplitude information.

* * * * *